US008887264B2

(12) United States Patent
Johnston, II et al.

(10) Patent No.: US 8,887,264 B2
(45) Date of Patent: Nov. 11, 2014

(54) MULTI-IDENTITY ACCESS CONTROL TUNNEL RELAY OBJECT

(75) Inventors: Richard Fendall Johnston, II, Salem, OR (US); Dean Edward Pierce, Portland, OR (US); William Jonathan Strauss, Independence, OR (US)

(73) Assignee: Ram International Corporation, Las Vegas, NV (US)

( * ) Notice: Subject to any disclaimer, the term of this patent is extended or adjusted under 35 U.S.C. 154(b) by 965 days.

(21) Appl. No.: 12/886,184

(22) Filed: Sep. 20, 2010

(65) Prior Publication Data

US 2011/0072507 A1     Mar. 24, 2011

Related U.S. Application Data

(60) Provisional application No. 61/244,148, filed on Sep. 21, 2009.

(51) Int. Cl.
*G06F 7/04*      (2006.01)
*H04L 29/06*    (2006.01)

(52) U.S. Cl.
CPC ......... H04L 63/0853 (2013.01); *H04L 63/0471* (2013.01); *H04L 63/105* (2013.01); *H04L 63/0876* (2013.01); *H04L 2463/082* (2013.01)
USPC .......................................................... 726/12

(58) Field of Classification Search
CPC ............ H04L 63/0853; H04L 63/0876; H04L 2463/082
USPC .......................................................... 726/12
See application file for complete search history.

(56) References Cited

U.S. PATENT DOCUMENTS

| 6,895,501 | B1 * | 5/2005 | Salowey ...................... 713/168 |
| 7,287,271 | B1 * | 10/2007 | Riggins ............................ 726/3 |
| 7,293,099 | B1 * | 11/2007 | Kalajan ......................... 709/230 |
| 8,424,079 | B2 * | 4/2013 | Adams et al. ................... 726/17 |
| 2002/0199007 | A1 | 12/2002 | Clayton et al. |
| 2003/0219022 | A1 | 11/2003 | Dillon |
| 2004/0093499 | A1 * | 5/2004 | Arditi et al. ................... 713/176 |
| 2005/0010758 | A1 | 1/2005 | Landrock |
| 2005/0015594 | A1 * | 1/2005 | Ashley et al. ................. 713/168 |
| 2005/0160161 | A1 | 7/2005 | Barrett |
| 2007/0300057 | A1 | 12/2007 | Corcoran et al. |
| 2009/0089460 | A1 * | 4/2009 | Komoda ......................... 710/13 |
| 2009/0193514 | A1 | 7/2009 | Adams et al. |
| 2009/0235069 | A1 * | 9/2009 | Sonnega et al. ............... 713/156 |
| 2010/0003972 | A1 * | 1/2010 | Little et al. .................... 455/418 |
| 2011/0224954 | A1 * | 9/2011 | Jayasundara et al. ............ 703/1 |

FOREIGN PATENT DOCUMENTS

EP          1349032 A1    1/2003

OTHER PUBLICATIONS

PCT US2010/049611 International Search Report dated May 26, 2011; Attached.
PCT US2010/049611 Written Opinion of the International Searching Authority dated May 26, 2011; Attached.
The extended European search report / PCT/US2010049611 dated Apr. 7, 2014; Attached.

* cited by examiner

*Primary Examiner* — Krista Zele
*Assistant Examiner* — James Forman
(74) *Attorney, Agent, or Firm* — Polster Lieder

(57) ABSTRACT

In various embodiments, the present disclosure provides a system and method for establishing a secure tunnel between a client device and a remote server utilizing multiple user identities, and in some embodiments, a client device identity, to authenticate access to the remote server.

11 Claims, 3 Drawing Sheets

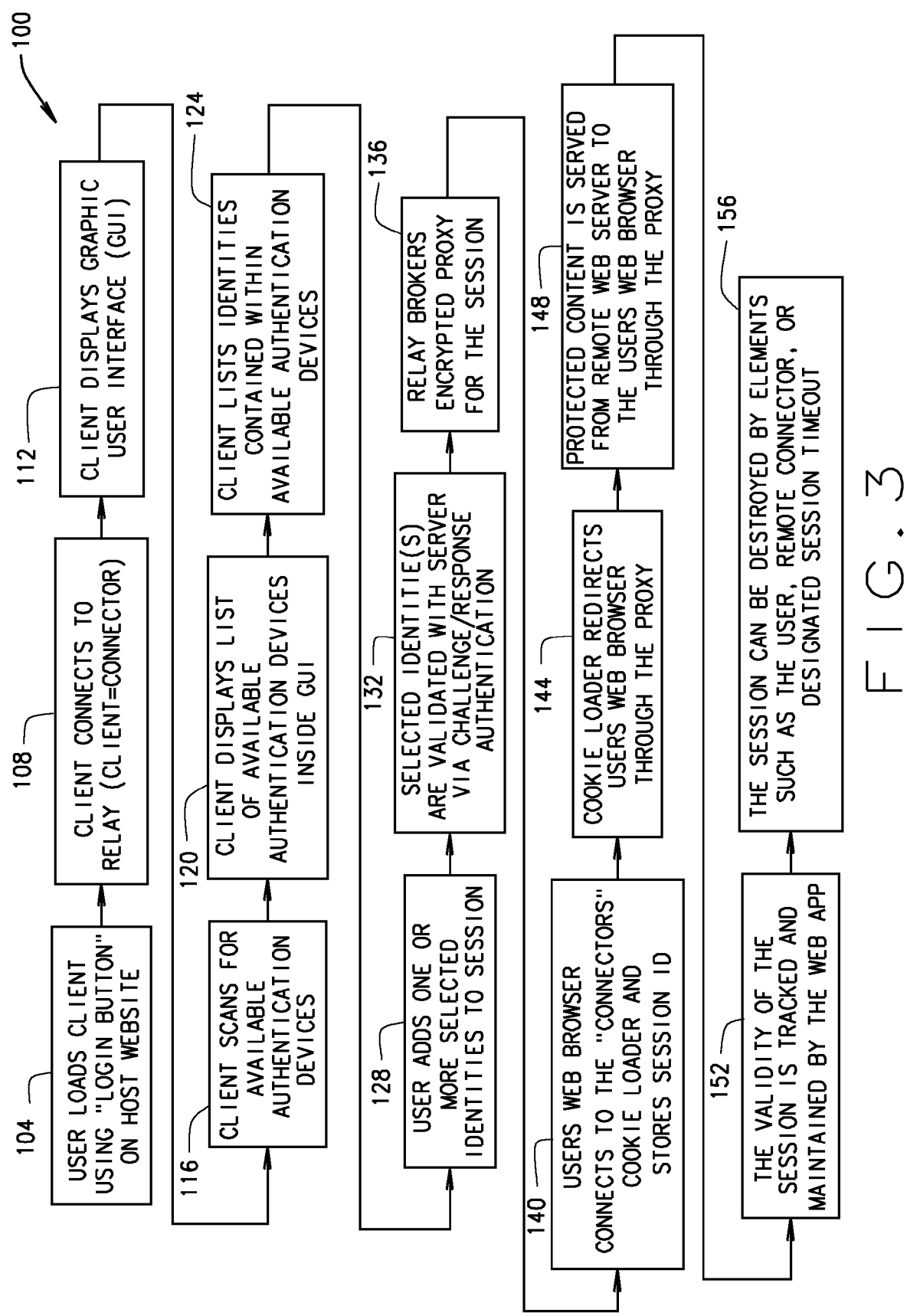

US 8,887,264 B2

MULTI-IDENTITY ACCESS CONTROL TUNNEL RELAY OBJECT

CROSS-REFERENCE TO RELATED APPLICATIONS

This application claims priority under 35 U.S.C. §119(e) to U.S. Provisional Patent Application No. 61/244,148 filed Sep. 21, 2009, entitled "MULTI-IDENTITY ACCESS CONTROL TUNNEL RELAY OBJECT" and is incorporated herein by reference.

COPYRIGHT NOTICE

A portion of the disclosure of this patent document contains material which is subject to copyright protection. The copyright owner has no objection to the reproduction by anyone of the patent disclosure as it appears in the United States Patent and Trademark Office records, but otherwise reserves all copyrights whatsoever.

FIELD

The present teachings relate to secure communications over the Internet.

BACKGROUND

The statements in this section merely provide background information related to the present disclosure and may not constitute prior art.

Typically, current role based access control (RBAC) systems utilize secured socket layer (SSL) based tunneling mechanisms to authenticate a single identity. Generally, that identity is authorized to perform a certain set of actions on a system defined by which roles are associated to that identity. Such SSL tunneling and single identity authentication offers only a single layer of encryption and is inadequate for certain tasks and/or sets of actions wherein a higher level of security is important.

SUMMARY

Generally, the present disclosure provides a system and method for establishing a secure tunnel between a client device and a remote server utilizing multiple user identities, and in some embodiments, a client device identity, to authenticate access to the server.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 3 is an exemplary flow chart of a method, implementable by the system shown in FIG. 1, for establishing a secure tunnel between a client device and a remote server utilizing multiple user identities, in accordance with various embodiments of the present disclosure.

Corresponding reference numerals indicate corresponding parts throughout the several views of drawings.

DETAILED DESCRIPTION

Figure 1:
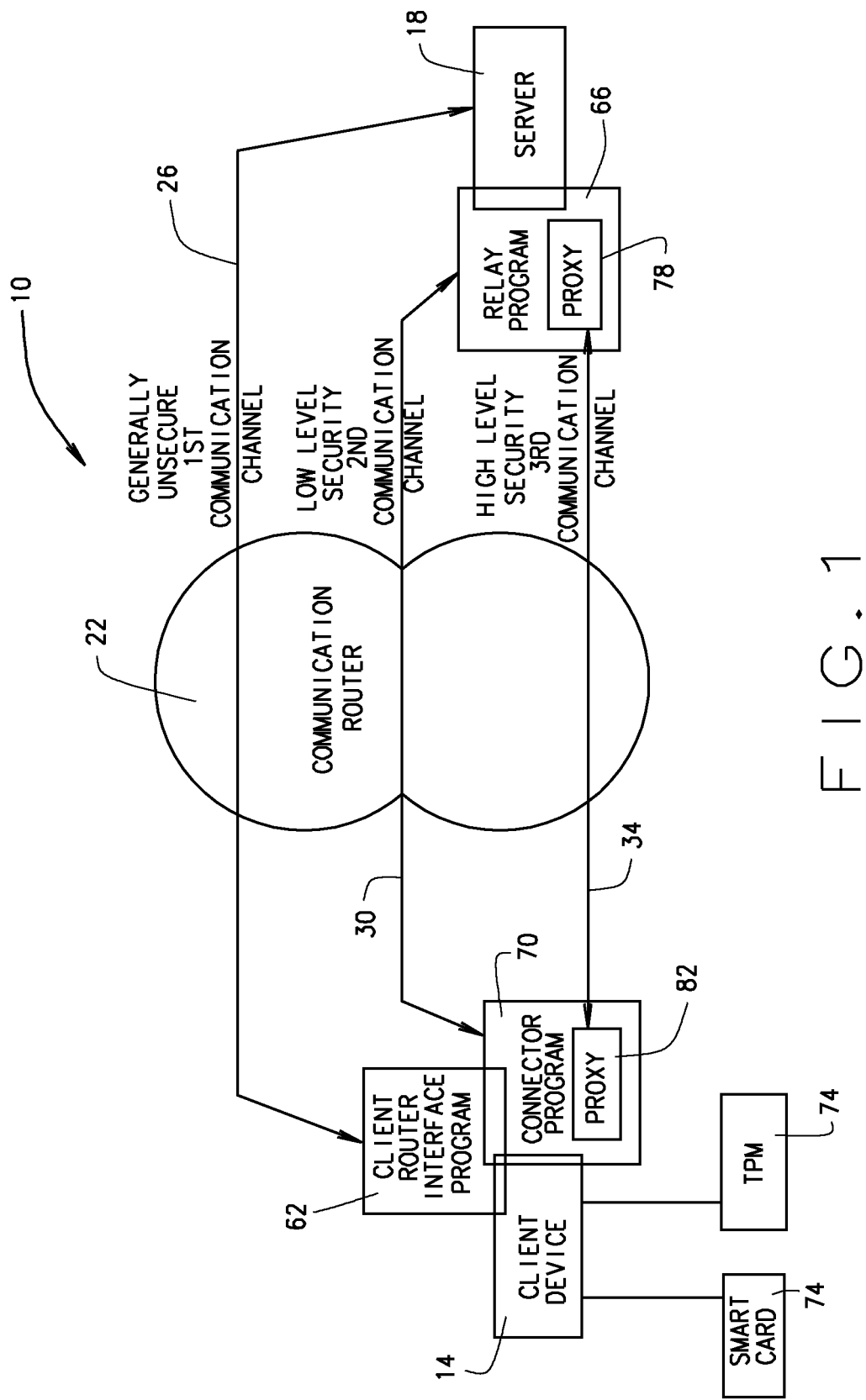
FIG. 1 is a block diagram of an exemplary system for establishing a secure tunnel between a client device and a remote server utilizing multiple user identities, in accordance with various embodiments of the present disclosure.

The following description is merely exemplary in nature and is in no way intended to limit the present teachings, application, or uses. Throughout this specification, like reference numerals will be used to refer to like elements.

FIG. 1 is a block diagram of an exemplary computer-based system or network 10, such as a Local Area Network (LAN) or a Wide Area Network (WAN), for establishing a secure tunnel between at least one client device 14 and a remote server 18 utilizing multiple user identities, and in some embodiments, a client device identity, to authenticate access to the server 18. In various embodiments, the system can include at least one client device 14 that is structured to be operatively connectable with the remote server 18, via a communication router 22, e.g., the Internet, to communicate data between the client device 14 and the server 18.

Although the system 10 can include a plurality of client devices 14 operatively connectable to the server 18, for simplicity and clarity, the system 10 will be described herein with reference to a single client device 14. However, it should be understood that the provisions of the present disclosure are equally applicable to embodiments including a plurality of client devices 14, each configured to operate substantially the same as the single client device 14 described below, and such embodiments remain within the scope of the present disclosure.

As described further below, the system 10 is operable such that the client device 14 and remote server 18 communicate with each other via a generally unsecure first communications channel 26 and a standard low level security second communications channel 30 to establish a high level security third communications channel 34 over which encrypted data can be passed.

Figure 2:
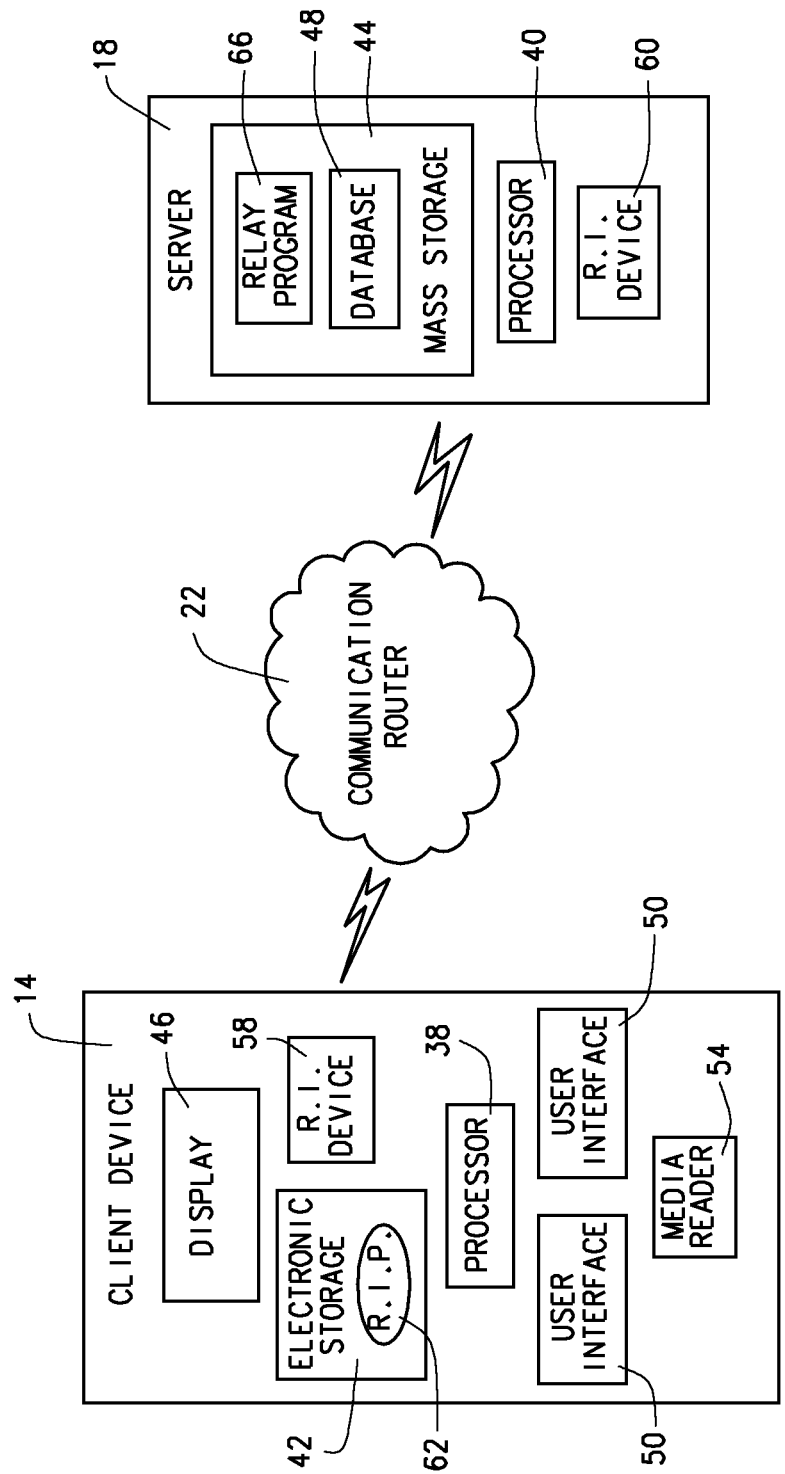
FIG. 2 is a block diagram illustrating various components of the client device and the remote server shown in FIG. 1, in accordance with various embodiments of the present disclosure.

Referring now to FIG. 2, in various implementations, the client device 14 can be a computer that includes a processor 38 suitable to execute all functions and programs of the client device 14. The client device 14 can additionally include at least one electronic storage device 42 that comprises a computer readable medium, such as a hard drive or any other electronic data storage device for storing such things as software packages or programs, algorithms and digital information, data, look-up tables, electronic spreadsheets and databases, etc. The client device 14 can further include a display 46 for displaying such things as information, data and/or graphical representations, and a plurality of user interface devices 50, for example a first user interface device and a second user interface device. Each user interface device 50 can be any suitable interface device such as a keyboard, mouse, stylus, microphone, scanner and/or an interactive touch-screen on the display, and the client device 14 can include any combination of two or more of such user interface devices 50.

In various embodiments, the client device 14 can still further include a removable media reader 54 for reading information and data from, and/or writing information and data to, removable electronic storage media such as floppy disks, compact disks, DVD disks, zip disks, or any other computer readable, removable and portable electronic storage media.

Alternatively, the removable media reader can be an I/O port utilized to communicate with external or peripheral memory devices such as thumb drives, memory sticks/cards or external hard drives. Still further, the client device 14 can include a router interfacing device 58, such as a dial-up modem, a cable modem, a satellite connection, a DSL (Digital Subscriber Line) connection, an Ethernet port, or the like.

Alternate embodiments of the client device 14 can include any electrical or electronic device capable of communicating with the remote server 18 via the communications router 22, such as a personal digital assistant (PDA), cellular phone, a telephone operating with an interactive voice-system, or a television operating with a cable or satellite television interactive system.

Similarly, in various embodiments, the remote server 18 can be a computer that includes a processor 40 suitable to execute all functions and programs of the remote server 18. The remote server 18 can additionally include at least one electronic storage device 44, e.g., a mass storage device, that comprises a computer readable medium, such as a hard drive or any other electronic data storage device for storing such things as software packages or programs, algorithms and digital information, data, look-up tables, electronic spreadsheets and, particularly at least one database 48. Furthermore, in various embodiments, the remote server 18 still further includes a router interfacing device 60, such as a cable modem, a satellite connection, a DSL (Digital Subscriber Line) connection, an Ethernet port, or the like.

Although, as described above, in various embodiments, the system 10 can be any computer-based network, such as a LAN or a WAN, for simplicity and clarity, the system will be described below with regard to various WAN embodiments. However, it should be understood that the provisions of the present disclosure are equally applicable to any other computer-based network where secure communication between the client device 14 and the server 18 is desired, and that such embodiments remain within the scope of the present disclosure.

In various embodiments, the client device processor 38 is capable of running a router interfacing program 62, such as a web browser program and hereafter alternatively referred to as the web browser, to communicate with the server 18, exemplarily a web server and hereafter alternatively referred to as the web server 18, via the communications router 22, exemplarily the Internet and hereafter alternatively referred to as the Internet 22. Generally, in such embodiments, a user can interact with the client device 14 by viewing data, via the display 46, and entering data, via the user interface devices 50. The web browser 62 allows the user to enter addresses, which are referred to as Uniform Resource Locators, or URLs, of specific web server contained objects to be retrieved or accessed, e.g., a website or a remote database. The web server contained objects can contain various types of content from plain textual information to more complex multimedia and interactive content, such as software programs, graphics, audio signals, videos, and so forth.

In such embodiments, wherein the server contained object comprises a website, a set of interconnected web pages, usually including a homepage, that are managed on the web server 18 as a collection are collectively referred to as a website. The content and operation of such websites are managed by the web server 18. More particularly, as described below, the web server 18 executes and implements a relay program 66 to establish the high level security third communications channel 34 between the client device 14 and the web server 18, thereby providing secure communications between the client device 14 and the web server 18.

The generally unsecure first communications channel 26 can implement any suitable communications protocol, such as HyperText Transfer Protocol (HTTP), to communicate data between the client device 14 and web server 18. Additionally, as described above, the communications router 22 can be any data exchange network that implements a respective suitable communications protocol, such as FTP (File Transfer Protocol), TELNET (Teletype Network), and the like to communicate over the generally unsecure first communications channel 26.

Referring now to FIGS. 1, 2 and 3, operation of the system 10 for establishing a secure tunnel between the client device 14 and the remote server 18 utilizing multiple user identities will now be described, in accordance with various embodiments. Initially, a user will execute the router interface program 62 on the client device 14, e.g., a web browser program, via one or more of the user interface devices 50. Next, using one or more of the user interface devices 50, the user will establish the generally unsecure first communications channel 26 with the remote server 18. For example, the user will enter a URL of the server 18 into the address line of a web browser 62. In response, the server 18 initiates execution of the relay program 66 and returns a home page of the host website addressed by the URL, wherein the home page includes a 'Login Button'. The user then selects the 'Login Button', at which point the host website may or may not request the user to input login information such as a username and password, as indicated at 104 of the flow chart 100 illustrated in FIG. 3. Subsequently, the relay program 66 will download a connector program 70, e.g., via JAVA Webstart, to the client device 14 and instruct the client device 14 to execute the connector program 70, as indicated at 108.

Upon execution of the connector program 70, the low level security second communications channel 30, e.g., an SSL channel, is established between the client side connector program 70 and the server side relay program 66.

Subsequently, execution of the connector program 70 provides a graphical user interface (GUI) on the client device display 46 and scans the client device for connected or onboard authentication devices 74, as indicated at 112 and 114. In various embodiments, authentication devices 74 can include any data storage device that can be connected to a data I/O port, e.g., USB port, serial port, etc., or read by the client device media reader, or is hardwired to the motherboard of the client device 14. For example, authentication devices 74 can include, thumb drives, memory sticks/cards, smart cards, external hard drives, floppy disks, compact disks, DVD disks, zip disks, cell phones, any other portable electronic storage media, or a trusted platform module (TPM) hardwired onto the client device motherboard, or a peripheral data input device such as a fingerprint reader. One or more authentication devices 74 may be connected to one or more client device I/O ports and/or onboard the client device motherboard.

Each authentication device 74 has stored thereon one or more user identity, or in various embodiments, reads and inputs identity data such as fingerprints. User identities provide such things as user credentials, rights or authentication levels, and comprise such things as alphanumeric or numeric authentication sequences, or security certificates. Generally, as described below, various combinations of identities stored on the authentication devices 74 are used to identify and authenticate the client device 14 and/or determine what type of privileges the user of the client device 14 should be allowed access to on the requested server contained object, e.g., website running on the server 18.

A list of available authentication devices 74 that are found to be present and a list of the various identities stored thereon or the corresponding data entry needed, e.g., fingerprint data, is then presented inside the GUI on the client device display 46, as indicated at 120 and 124. In various embodiments, a username and password may additionally be required to access the list of identities on one or more of the authentication devices 74 found to be present.

As described below, in various embodiments, one of the authentication devices can comprise a trusted platform module (TPM) disposed within the client device 14, wherein the system and methods described herein can leverage the TPM in the client device 14 such that not only can the user be identified via the various authentication devices 14, but also such that the client device 14 can be identified and authenticated. Thus, the client device 14 can be a quarantined computer-based system that is particularly authenticated for use to access the requested server contained object, e.g., website. Hence, in various embodiments, identification and authentication of the client device 14 can be required in combination with one or more of the user's identities to access the requested server contained object.

Then, based on the requested server contained object, the user selects one or more identities from those listed that are necessary to gain access to the requested server contained object, as indicated at 128. The selected identities are then passed to the server 18, via the low level security second communications channel 30, where they are interpreted and verified, i.e., validated, by the relay program 66 via challenge-response authentication, as indicated at 132.

Upon validation of the selected identities, the relay program 66 then brokers an encrypted proxy session between the server 18 and the client device 14, as indicated at 136. Particularly, the relay program 66 substantiates a server side proxy 78 and communicates with the client device connector program 70, via the second communication channel 30, whereby the connector program 70 substantiates a client side proxy 82. Once the client side proxy 82 is established, the relay program 66 establishes the high level security third communications channel 34 and the encrypted proxy session between the client side proxy 82 and the server side proxy 78, via the high level security third communications channel 34.

Hence, a multi-tiered access control rule set can be applied to any server contained object based upon several sets of identities per the authentication device 74. Identities within each authentication device 74 not only determine the user to be an authorized user, but can also identify the current client device 14 being used for heightened security authorized access. By identifying the client device 14 being used for authorized access a quarantined state can be implemented from the server side, further ensuring the security of the ultimately established encrypted proxy session.

Once the encrypted proxy session over the third communications channel 34 is established, the client device router interface 58, e.g., web browser, connects to a cookie loader of the connector program 70 and stores a session ID for the encrypted proxy session in random access memory of the client device 14, as indicated at 140. The cookie loader additionally redirects the client router interface 62 through the client side proxy 82 such that all protected content is passed between the server 18 and the client device 14 via the encrypted proxy session over the third communications channel 34, as indicated at 144 and 148.

In various embodiments, the server contained object can include a tracking program that is executed once the encrypted proxy session is established over the third communications channel 34 as described above, as indicated at 152. The tracking program tracks and maintains the validity of the encrypted proxy session.

Moreover, the encrypted proxy session can be terminated in various manners from either the client side or the server side, as indicated at 156. For example, the encrypted proxy session can be terminated by the user logging out or closing the client router interface program 62. Or, the encrypted proxy session can be destroyed by the client side router interfacing program 62 informing the connector program 70 of malicious behavior or the server side server contained object informing the relay 66 of malicious behavior. For example, the session may be destroyed after a predetermined 'Time Out' time has elapsed, or if the user tries to access information or a server contained object for which the user does not have the proper identities. Upon termination of the encrypted proxy session, in any manner, the high level security third communications channel 34 is destroyed.

Alternatively, the encrypted proxy session can be terminated and the high level security third communications channel 34 destroyed by removing the authentication device(s) 74 from the client device 14.

In various embodiments, once a user has established the encrypted proxy session and high level security third communications channel 34, and gained access to a primary sever contained object, the user may desire access to a secondary server contained object or particular information within a currently accessed object. In such instances, additional identities may be required. Such additional identities can be required from the original users by selecting additional identities from the authentication devices 74 already located by the connector program 70, in which case the user would merely select the necessary additional identity or identities from the previously displayed list.

Or, in other embodiments, the additional identities may be stored in a secondary authentication device 74, i.e., a second, third, forth, etc. authentication device 74. In such instances, access to the requested secondary server contained object or information would require that the secondary authentication device 74 be connected to the client device 14, at which point the connector program 70 would locate the secondary authentication device 74 and list the identities stored thereon. The user would then select the necessary identities from the secondary list of identities to gain access to the requested secondary server contained object or information.

In various other embodiments, an additional level of security may be added by imposing a 'Two-Man Rule' to gain access to a primary server contained object, or to a secondary server contained object or information. In such embodiments, the secondary authentication device(s) 74 and corresponding required identities can be accessible only by a second user, i.e., someone other than the first user that originally initiated the encrypted proxy session as described above. Such embodiments would require that the second user be present to connect the secondary authentication device(s) 74 to the client device 14, in addition to any currently connected authentication devices 74 provided by the first user, and enter a user name and/or password only known to the second user to gain access to a list of the identities stored on the secondary authentication device(s) 74. One or more identities from the second user's secondary authentication device(s) 74 would then be selected and authenticated by the server side relay program 66 to gain access to the requested server contained object or information.

For example, if a first user has provided the proper identities to establish the encrypted proxy session and corresponding high level security third communications channel 34, and gained access to the requested sever contained object, e.g., a joint bank account. The first user may have access only to certain privileges within such a bank account. For example, the first user may be limited in the amount money he/she can transfer from the account. Transferring money in an amount greater than this limit may require implementation of the 'Two-Man Rule'. In such instances, a second user would be required to provide one or more secondary authentication devices 74 and corresponding needed identities, as described herein, in order to transfer the larger sum of money.

Alternatively, in various other embodiments, the 'Two-Man Rule' can require that the second user use a second client device 14 to establish a second encrypted proxy session and corresponding second high level security third communications channel 34 between the server 18 and the second client device 14, in the same manner as the primary encrypted proxy session and corresponding high level security third communications channel 34 described above. In such embodiments, the second user can be required to provide the proper secondary authentication device(s) 74 and identities in order for the first user (and the second user) to access the requested server contained object or information.

Additionally, in a various embodiments, the 'Two-Man Rule' can be implemented such that a third, forth, fifth, etc., user is required provide corresponding third, forth fifth, etc., authentication devices 74 and identities to access the requested server contained object or information, in the same manner as described above with regard to a second user and secondary authentication device(s) 74.

Similarly, once access to the server contained object or information has been established, as described above, access to another server contained object or other information may not require the multiple authentication devices and/or multiple identities. In which case, the unneeded authentication devices 74 and/or multiple identities can be removed or terminated.

In various other embodiments, the relay program 66 can be installed on a plurality of remote servers 18 in order to offer access to the plurality of different servers 18. In such embodiments, one server 18 and corresponding relay program 66 would act as a 'hub server' and relay program 66 to which the other servers 18 and relay programs 66 communicate back to. The 'hub server' and corresponding relay program 66 would then communicate with the client device 14 via the encrypted proxy session and high level security third communications channel 34 established between the client device 14 and 'hub server' 18, as described above. Additionally, in various implementations, a high level security third communications channel 34 can be established between the 'hub server' 18 and one or more other remote servers 18 in the same manner as described above.

Hence, the multi-identity access control tunnel relay object protocol described herein offers enhanced security to existing computer information systems in several ways. It can be a direct replacement for exclusively SSL based tunneling mechanisms. The multi-identity access control tunnel relay object protocol described herein offers the benefit of identity based challenge and response authentication and an additional layer of encryption. In addition to these new benefits, the multi-identity access control tunnel relay object protocol described herein offers the ability to require multiple credentials from one or more users to access extended sets of privileges or secret documents or objects contained on a high security computer information system.

Multiple credential based access can enhance the responsibility level of the user(s) and make theft of credentials far more difficult and therefore, further protect the integrity of the computer information system and its contents and access to other systems that are connected on the same closed circuit network. Further the multi-identity access control tunnel relay object protocol described herein offers the ability to authenticate the client device 14 being used to access a remote server 18. An identity for a specific client device 14 offers a new layer of audit and access logging.

A number of requirements can be enforced for a client device 14 to be trusted such as; the location of the client device 14, what kind of network the device 14 is connected to, how frequently the client device 14 is inspected and maintained, how many different users are allowed access to the client device 14, who is allowed access to the client device 14 as well as what credentials are required to allow access to the remote server 18. All of these provide an ability to track access and create audit trails based upon hardware tokens and real cryptography versus secret (password) based authentication and low security protocols such as SSL and TLS.

With the multi-identity access control tunnel relay object protocol described herein, multiple identities are used to authenticate a single session. This allows for scenarios where an organization running a secure service (remote server) 18 wants to ensure that not only is the user of the service someone that is trusted, but also that client device 14 that is accessing the service is trusted. Also, with utilizing the multi-identity access control tunnel relay object protocol described herein, certain operations may only be allowed with multiple users are present and identities can be added and removed from the session in real time, allowing for a flexible scale of trust/authentication The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for establishing a secure tunnel between a client device and a remote server utilizing multiple identities to authenticate access to the remote server, said method comprising:

executing a relay program at the remote server and downloading a connector program from a remote server to the client device upon execution of the relay program;

scanning the client device for one or more authentication devices that are at least one of removably connected to and fixed onboard the client device, via execution of the connector program, each authentication device having stored thereon one or more identity;

selecting multiple identities from the identities stored on the one or more authentication devices, passing the selected identities to the remote server, and validating the passed identities, via challenge-response authentication performed by the relay program;

establishing a high level security communications channel and brokering an encrypted proxy session between a remote server side proxy, substantiated via execution of the relay, and a client side proxy, substantiated via execution of the connector program;

providing access by the client device to a first server contained object via the encrypted proxy session over the high level security communications channel;

removably connecting one or more additional authentication devices to the client device to provide identities required to access a second server contained object or particular data within the first server contained object; and requiring the one or more additional authentication devices to be provided by a second user.

2. The method of claim 1, wherein executing the relay program comprises establishing an unsecure first communications channel between the client device and the remote server, via which the connector program is downloaded from the remote server to the client device.

3. The method of claim 2 further comprising executing the connector program at the client device to establish a low level security second communications channel between the connector program and the relay program.

4. The method of claim 3, wherein selecting multiple identities and passing the selected identities to the remote server comprises passing the selected multiple identities to the remote server via the low level security second communications channel.

5. The method of claim 1 wherein selecting multiple identities comprises selecting at least one identity from a fixed authentication device that is integrally connected onboard the client device and selecting at least one identity from a removably connected authentication device that is provided by the user and removably connectable to the client device.

6. The method of claim 5, wherein selecting the at least one identity from the fixed authentication device comprises selecting at least one identity that identifies the client device.

7. The method of claim 1 further comprising selecting additional identities from the one or more authentication devices to access a second server contained object or particular data within the first server contained object.

8. A method for establishing a secure tunnel between a client device and a remote server utilizing multiple identities to authenticate access to the remote server, said method comprising:

establishing an unsecure first communications channel between the client device and the remote server;

executing a relay program at the remote server upon establishment of the first communications channel;

downloading a connector program from the remote server to the client device upon execution of the relay program;

executing the connector program to establish a low level security second communications channel between the connector program and the relay;

scanning the client device for one or more authentication devices that are at least one of removably connected to and fixed onboard the client device, via execution of the connector program, each authentication device having stored thereon one or more identity;

selecting multiple identities from the identities stored on the one or more authentication devices, and passing the selected identities to the remote server, via the low level security second communications channel;

validating the passed identities, via challenge-response authentication performed by the relay program;

substantiating a remote server side proxy, via execution of the relay, and a client side proxy, via execution of the connector program;

establishing a high level security third communications channel and brokering an encrypted proxy session between the remote server side proxy and the client side proxy;

providing access by the client device to a first server contained object via the encrypted proxy session over the high level security third communications channel;

removably connecting one or more additional authentication devices to the client device to provide identities required to access a second server contained object or particular data within the first server contained object; and requiring the one or more additional authentication devices to be provided by a second user.

9. The method of claim 8, wherein selecting multiple identities comprises selecting at least one identity from an authentication device that is integrally fixed onboard the client device and selecting at least one identity from a removably connected authentication device that is provided by the user and removably connectable to the client device.

10. The method of claim 9, wherein selecting the at least one identity from the fixed authentication device comprises selecting at least one identity that identifies the client device.

11. The method of claim 8 further comprising selecting additional identities from the one or more authentication devices to access a second server contained object or particular data within the first server contained object.

* * * * *